United States Patent
Schmidt et al.

(10) Patent No.: US 6,707,364 B1
(45) Date of Patent: Mar. 16, 2004

(54) REMOTE FEEDER REACTANCE COIL

(75) Inventors: Rainer Schmidt, Lüderburg (DE); Günter Widera, Achtum (DE)

(73) Assignee: FUBA Communications Systems GmbH, Bad Salzdetfurth (DE)

(*) Notice: Subject to any disclaimer, the term of this patent is extended or adjusted under 35 U.S.C. 154(b) by 0 days.

(21) Appl. No.: 09/868,391
(22) PCT Filed: Dec. 17, 1999
(86) PCT No.: PCT/EP99/10100
§ 371 (c)(1), (2), (4) Date: Jun. 18, 2001
(87) PCT Pub. No.: WO00/38347
PCT Pub. Date: Jun. 29, 2000

(30) Foreign Application Priority Data
Dec. 18, 1998 (DE) .......................... 198 58 506

(51) Int. Cl.[7] ............................................. H01F 38/20
(52) U.S. Cl. ....................................................... 336/174
(58) Field of Search ...................... 336/174; 323/356, 323/357, 358; 324/250–251, 117

(56) References Cited

U.S. PATENT DOCUMENTS 4,806,834 A * 2/1989 Koenig ........................ 310/162
4,961,049 A * 10/1990 Ghislanzoni ............. 324/117 H

FOREIGN PATENT DOCUMENTS

| DE | 3122084 | 1/1983 |
|----|---------|--------|
| DE | 19536520 | 4/1997 |
| DE | 19623040 | 12/1997 |
| WO | 9840980 | 9/1998 |

* cited by examiner

*Primary Examiner*—Lincoln Donovan
*Assistant Examiner*—Jennifer A. Poker
(74) *Attorney, Agent, or Firm*—Volpe and Koenig, PC

(57) ABSTRACT

A remote feeder reactance coil and a signal transmission system. The invention relates to a remote feeder reactance coil (100) for energy input and output in signal transmission lines, as well as in signal transmission systems including signal transmission lines, where intermediate amplifiers are supplied with electrical energy via said signal transmission lines. In order to provide reactionless connection of a high-frequency signal path and a low-frequency energy supply in signal transmission systems over an as large as possible frequency range, at the same time keeping the required manufacturing effort small, the invention provides a remote feeder reactance coil (100) including a primary winding (102) carrying a feed current as well as an attenuation circuit (118) in which at least the secondary winding (112), which is part of said attenuation circuit (118), or the primary winding (102) are of an electrically insulated conductive material, wherein said secondary winding (112) and said primary winding (102) interact through capacitive and/or inductive coupling.

20 Claims, 3 Drawing Sheets

REMOTE FEEDER REACTANCE COIL

The invention relates to a remote feeder reactance coil for energy input and output in signal transmission lines as well as in signal transmission systems including signal transmission lines, where intermediate amplifiers are supplied with electrical energy via said signal transmission lines.

Signal transmission systems known from practice transmit a high-frequency signal from a signal source to a signal drain via a signal transmission line, e.g. a coaxial cable. For this purpose, large distances often need to be bridged. As a result, the high-frequency signal will become attenuated even in high-quality lines, for which reason intermediate amplifiers will be required for regenerating the signal level.

In signal transmission systems of the prior art, such intermediate amplifiers may be supplied with electrical energy via the signal transmission line—which will eliminate the need for separate supply lines. In general, signal transmission lines of this design concept are subdivided into plural transmission sections or segments interconnected via couplers which present an as small as possible resistance to the high-frequency wanted signal. Within said transmission sections, energy is input or output via remote feeder reactance coils which constitute separation points for the high-frequency wanted signal. Consequently, the wanted signal will not become substantially attenuated at the input and output sites. However, in view of the specific design of remote feeder reactance coils there is the danger of resonances occurring at certain frequencies which will limit the useful frequency range of the signal transmission line.

Whether or not, and to what extent, resonance effects will occur depends very much on the self-resonance behaviour of the remote feeder reactance coils. For this reason, various designs have been developed in practice in which any occurring self-resonances will either be attenuated or altogether shifted to a frequency range which is uncritical for the wanted signal. For attenuating the self-resonance effects of the winding sections of remote feeder reactance coils, for example, it is known from practice to wire a remote feeder reactance coil with resistors or conductive layers. As an alternative, or commutatively to such attenuation, it is likewise known from practice to cause such a shifting of self-resonances by varying the spacing of the turns and/or of winding sections of the remote feeder reactance coil. Moreover, remote feeder reactance coils of the prior art are further known to have the turns of the reactance coil counter wound onto a common core so as to prevent the formation of any possibly resulting noise fields.

The disadvantages of the remote feeder reactance coils known from practice above all result from the fact that the self-resonances of the circuitry will strongly light the useful frequency ranges, despite the wirings and different winding types. Furthermore, the inductance values which can be reached with the known remote feeder reactance coils are limited with given volumes. Another problem is the considerable manufacturing effort, especially when such coils are wired with resistors and conductive layers since their exact dimensions and positions will be decisive of the resonance behaviour of the remote feeder reactance coil. The same is true for the variation of the windings, so that, in summary, one can say that prior art remote feeder reactance coils make maximum demands on production engineering, in view of the required precision in manufacturing.

It is the object of the invention to provide a reactionless connection of a high-frequency signal path and a low-frequency energy supply for signal transmission systems over an as broad as possible frequency range, at the same time keeping the required manufacturing effort small.

In accordance with the invention, a remote feeder reactance coil comprises a primary winding, preferably of an electrically insulated conductive material, carrying the feed current, and an attenuation circuit of a kind which has a secondary winding of a preferably electrically insulated conductive material, wherein said secondary and primary windings interact with each other through capacitive and/or inductive coupling. Providing a secondary winding of an electrically insulated conductive material is a much less complex step in manufacturing than the comparable measures of the prior art. At the same time, its presence allows very precise and effective influencing of the self-resonance behaviour of the remote feeder reactance coil since the use of a secondary winding clearly allows more positioning and design alternatives than other means of the prior art.

The use of a secondary winding allows a well-aimed intervention in the internal function mechanism of the reactance coil which results in the secondary winding undesired interactions of individual winding sections of the primary winding.

Preferably, said primary and secondary windings have substantially parallel winding axes, in particular one common windings axis. This considerably diminishes the required manufacturing effort. If any turns of said secondary winding extend between the turns of the primary winding, the turns of the secondary winding will shield the turns of the primary winding from each other. This will largely eliminate any undesired effects between individual turns of the primary winding which occur in other designs and, cumulated, will cause the disadvantageous resonance effects. If the turns of the primary and secondary windings each are wound the ones on top of the others in a radial direction, a comparatively analogous result is obtained regarding self-resonance suppression.

The possibility of varying the ohmic resistance of said attenuation circuit e.g. by means of an ohmic resistor, allows the attenuation behaviour to be influenced precisely.

The presence of the secondary winding according to the invention allows an increase both of the reproducibility and the precision of remote feeder reactance coils, at the same time leaving a lot of leeway concerning the dimensions, choice of material and wiring of said secondary winding. Another possibility is to electrically connect one end of the secondary winding to the primary winding. Furthermore, if one substitutes complex functioning circuitry for the ohmic resistor, this will allow a well-aimed influencing of the behaviour of the attenuation winding in the frequency range.

A more detailed understanding of the invention may be had from the following description of a preferred example, given by way of example and to be understood in conjunction with the accompanying drawings wherein.

Figure 1:
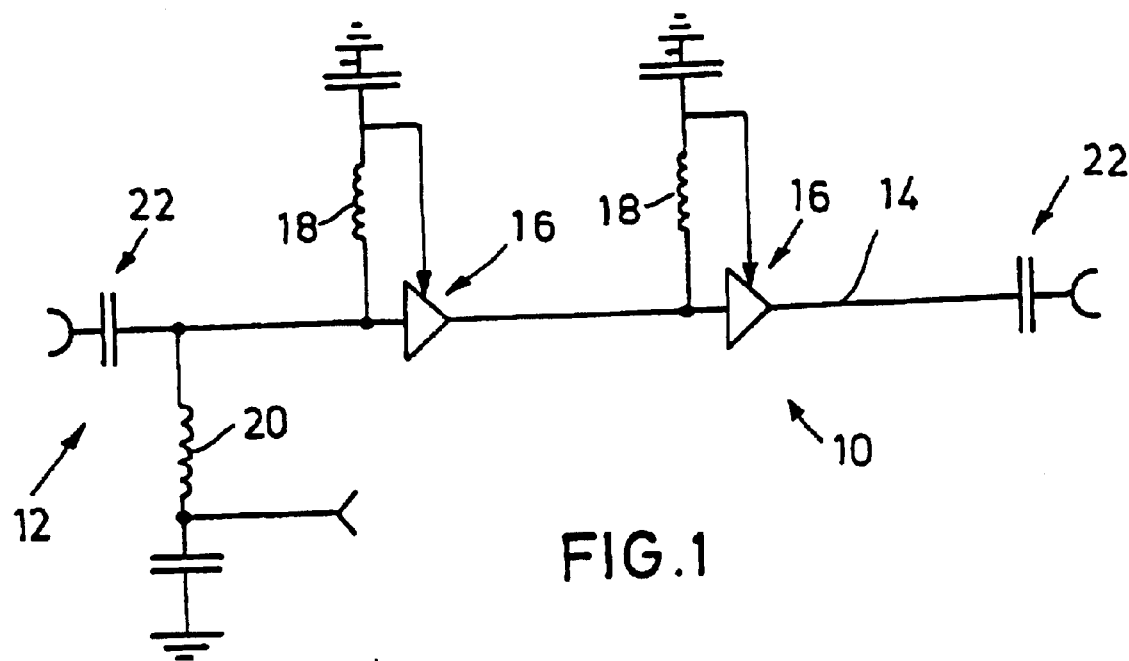
FIG. 1 is a schematic of a transmission section of a signal transmission line used in a signal transmission system.

The transmission section 10 of a signal transmission line 12 shown in FIG. 1 (essentially comprises a coaxial cable 14 which has two intermediate amplifiers 16 built into it. Said intermediate amplifiers 16 receive their energy via remote feeder reactance coils 18 of the inventive design which are grounded via a capacitor. The energy output via said remote feeder reactance coils 18 is input to the transmission section 10 (which—concerning energy supply—is separated from the adjacent transmission sections by capacitances 22) via a remote feeder reactance coil 20 for energy input which is likewise of the inventive design and is also grounded via a capacitor.

Figure 2:
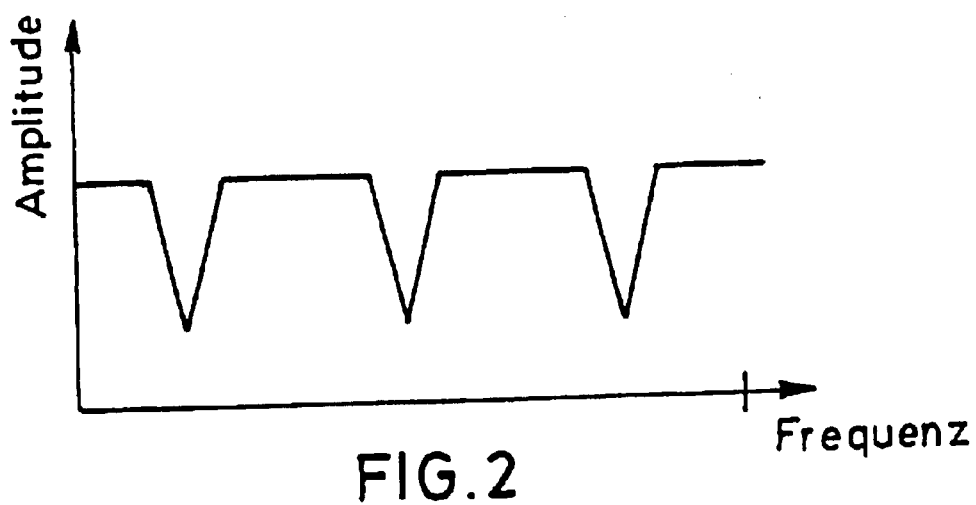
FIG. 2 is a graphical of the possible influence of a remote feeder reactance coil lacking any self-resonance-suppression-measures on the transmission behavior of a signal transmission system.

FIG. 2 shows the possible influence a remote feeder reactance coil lacking any self-resonance-suppression-measures may have on the transmission behavior. It may be gathered from this view that the a.c. resistance will decrease with certain frequencies. This is tantamount to a negative influence on a wanted signal to be transmitted.

Figure 3:
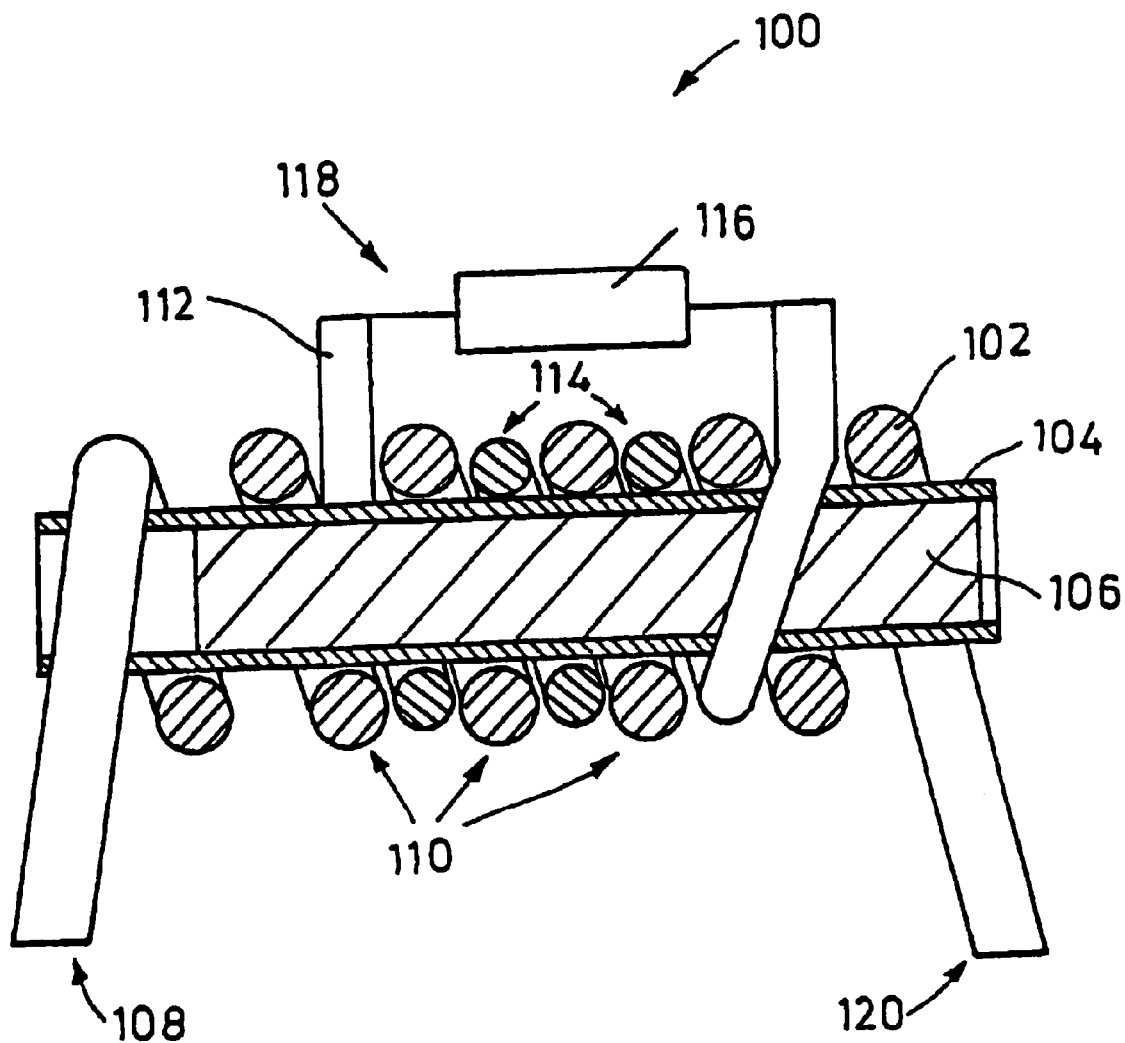
FIG. 3 is a view of a remote feeder reactance coil configured in accordance with a first embodiment of the present invention.

FIG. 3 shows a remote feeder reactance coil 100 of a first embodiment of the invention. Said remote feeder reactance coil 100 comprises a primary winding 102 of copper wire which is e.g. wound about a tubular body 104 made of plastic material. Inside said tubular body 104 is a core 106 of ferromagnetic material. The primary winding 102 has its terminal 108 connected to a signal transmission line and its terminal 120 connected to the energy supply.

Extending in parallel to said primary winding 102 is a secondary winding 112 of copper wire whose turns 114, just like the turns 110 of the primary winding 102, extend in close contact with and on said tubular body 104. The turns 114 of the secondary winding 112 extend between the turns 110 of said primary winding 102 and are thus uniformly spaced, likewise viewed from the longitudinal direction of the remote feeder reactance coil. Said secondary winding 114 is closed by an ohmic resistor 116 which is schematically shown, to give an attenuation circuit 118.

Coated on the turns 110 and 114 of the primary and secondary windings 102, 112. resp. i.e. on at least one winding thereof, is a layer of insulating varnish so as to electrically insulate said turns 110, 114 from each other.

In operation, the terminal 106 of said primary winding 102 is connected to the high-frequency part of a circuit or a signal transmission line. The terminal 120 is both connected to a low-frequency energy input and, via a capacitor for electric shock hazard protection, to circuit ground. In operation, the secondary winding 112, together with the ohmic resistor 116, will generate a resistance load along a section of said primary winding 102, which load will effectively suppress the formation of parasitic resonances in the useful frequency range without considerably influencing the characteristics of said remote feeder reactance coil 100 in high-frequency applications.

Figure 4:
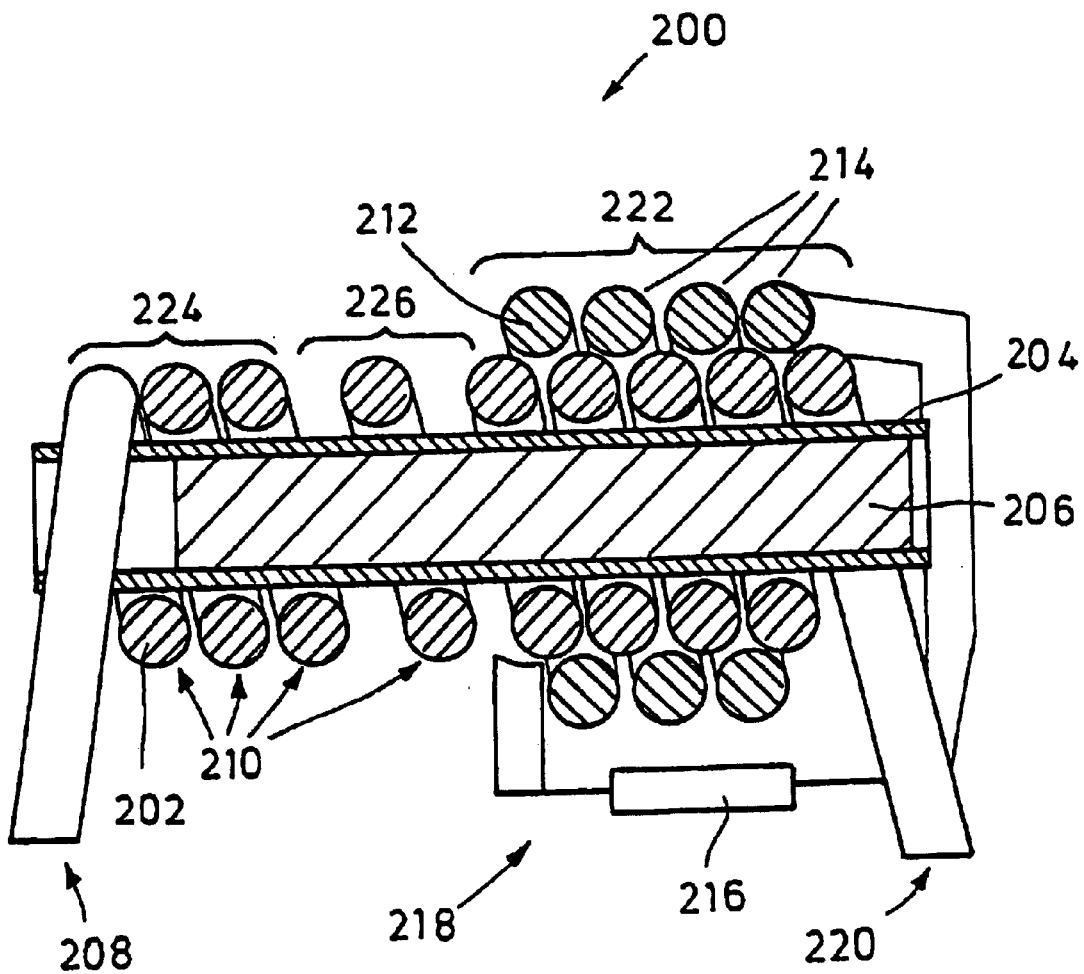
FIG. 4 is a view of a remote feeder reactance coil configured in accordance with a second embodiment of the present invention.

FIG. 4 shows a remote feeder reactance coil 200 of a second embodiment. Since the remote feeder reactance coils 100, 200 of the first and second embodiments are identical in essential design features, design elements of the remote feeder reactance coil 200 of the second embodiment which are identical to those of the remote feeder reactance coil 100 of the first embodiment are marked with basically the same reference numerals as those of the first embodiment, but increased by 100. In this respect, reference is also made to those parts of the description which concern the remote feeder reactance coil 100 of the first embodiment. In particular, reference sign 204 designates a tubular body, 206 designates a core, and 208 designates a terminal.

The individual turns 210 of the primary winding 202 of the remote feeder reactance coil 200, which are electrically separated and insulated from each other by means of a varnish coating on the wire material of the primary winding 202, extend in direct and close contact on each other in a first area 222 and a second area 224, while they are spaced from each other in a third area 226 which extends between said first and second areas. Said secondary winding 212 which also includes an ohmic resistor 216 to give an attenuation circuit 218, has turns 214, which, viewed in the radial direction of the remote feeder reactance coil 200, extend on the external surface of the turns 210 in the first area 222. Said turns 214 contact each other through their varnish coatings. In the remote feeder reactance coil 200 of the second embodiment, the terminal 220 of the primary winding 202 and the terminal of the secondary winding 212 are electrically interconnected.

What is claimed is:

1. A remote feeder reactance coil for supplying energy to, or withdrawing energy from, a high-frequency signal transmission line, said remote feeder reactance coil comprising:
    a primary winding consisting of an electrically conductive the primary winding being connected to the high-frequency signal transmission line; and
    a suppression circuit including (i) a secondary winding consisting of an electrically conductive material and (ii) a resistive load, wherein the suppression circuit introduces the resistive load along a section of the primary winding, and the resistive load suppresses parasitic resonance frequencies without considerably influencing the characteristics of the remote feeder reactance coil for high-frequency applications.

2. The remote feeder reactance coil of claim 1 wherein said primary and said secondary windings have substantially parallel winding axes.

3. The remote feeder reactance coil of claim 2 wherein the turns of said secondary winding extend between the turns of said primary winding.

4. The remote feeder reactance coil of claim 2 wherein the turns of said secondary winding are wound within the turns of said primary winding, below the latter, or outside and on the turns of said primary winding.

5. The remote feeder reactance coil of claim 1 wherein said conductive material of said secondary winding is a material with an ohmic resistance.

6. The remote feeder reactance coil of claim 1 wherein said resistive load includes an ohmic resistor for connecting the terminals of said secondary winding.

7. The remote feeder reactance coil of claim 1 wherein said suppression circuit further includes a foil or a layer of conductive varnish with an ohmic resistance for connecting the terminals of said secondary winding.

8. The remote feeder reactance coil of claim 1 wherein said suppression circuit includes an arrangement of at least one ohmic resistor and one further reactive element for connecting the terminals of said secondary winding.

9. The remote feeder reactance coil of claim 1 wherein said suppression circuit includes a terminal which is electrically connected to said primary winding.

10. The remote feeder reactance coil of claim 1 wherein said primary winding, said secondary winding, or said primary winding and said secondary winding comprise one insulated wire.

11. The remote feeder reactance coil of claim 1 wherein said primary winding is spirally wound up onto a tubular body.

12. The remote feeder reactance coil of claim 11 wherein said tubular body encompasses a core of ferromagnetic material.

13. The remote feeder reactance coil of claim 2 wherein said primary and said secondary windings have a common winding axis.

14. A remote feeder reactance coil for supplying energy to, or withdrawing energy from, a high-frequency signal transmission line, said remote feeder reactance coil comprising:
- a primary winding consisting of an electrically conductive material and includes a first terminal connected to the high-frequency transmission line;
- a suppression circuit including (i) a secondary winding consisting of an electrically conductive material and (ii) a resistive load, wherein individual turns of the primary winding maintain close proximity to each other in a first and second area of the coil, and are spaced from each other in a third area which extends between said first and second areas.

15. The remote feeder reactance coil of claim 14 wherein the suppression circuit introduces the resistive load along a section of the primary winding.

16. The remote feeder reactance coil of claim 14 wherein the resistive load suppresses parasitic resonance frequencies without considerably influencing the characteristics of the remote feeder reactance coil for high-frequency applications.

17. The remote feeder reactance coil of claim 14 wherein said primary winding is spirally wound up onto a tubular body.

18. The remote feeder reactance coil of claim 17 wherein said tubular body encompasses a core of ferromagnetic material.

19. A remote feeder reactance coil for supplying energy to, or withdrawing energy from, high-frequency signal transmission lines, comprising:
- a primary winding of an electrically conductive material which carries a feed current; and
- an attenuation circuit including a resistive load and a secondary winding consisting of an electrically insulated conductive material, wherein said secondary winding and said primary winding interact with each other through capacitive and/or inductive, coupling, wherein the resistive load eliminates at least one parasitic resonant frequency associated with the primary winding.

20. A signal transmission system, comprising:
- a plurality of high-frequency transmission lines; and
- a plurality of intermediate amplifiers, wherein said amplifiers are supplied with electrical energy via said transmission lines and the remote feeder reactance coil of claim 19.

* * * * *

UNITED STATES PATENT AND TRADEMARK OFFICE
CERTIFICATE OF CORRECTION

PATENT NO. : 6,707,364 B1
DATED : March 16, 2004
INVENTOR(S) : Schmidt et al.

It is certified that error appears in the above-identified patent and that said Letters Patent is hereby corrected as shown below:

Column 2,
Line 20, insert -- effectively suppressing -- after "secondary winding".
Line 56, insert -- view -- after "graphical".

Column 3,
Line 39, delete "106", and insert therefor -- 108 --.

Column 4,
Line 17, insert -- material -- after "electrically conductive".

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,707,364 B1
DATED : March 16, 2004
INVENTOR(S) : Schmidt et al.

It is certified that error appears in the above-identified patent and that said Letters Patent is hereby corrected as shown below:

Column 2,
Line 20, insert -- effectively suppressing -- after "secondary winding".
Line 56, insert -- view -- after "graphical".
Line 67, delete "(" after "Fig. 1".

Column 3,
Line 39, delete "106", and insert therefor -- 108 --.

Column 4,
Line 17, insert -- material -- after "electrically conductive".

Signed and Sealed this

Fourth Day of January, 2005

JON W. DUDAS
*Director of the United States Patent and Trademark Office*